(Model.)

2 Sheets—Sheet 1.

F. F. SMITH & J. W. LOCKWOOD.
POWER LIFT FOR PLOWS.

No. 262,547.  Patented Aug. 8, 1882.

Witnesses:
B. Carlyle Fenwick
Robt. L. Fenwick

Inventor:
Francis F. Smith
John W. Lockwood
by their attys
Fenwick & Lawrence

N. PETERS, Photo-Lithographer, Washington, D. C.

(Model.) 2 Sheets—Sheet 2.

F. F. SMITH & J. W. LOCKWOOD.
POWER LIFT FOR PLOWS.

No. 262,547. Patented Aug. 8, 1882.

Witnesses:
B. Carlyle Fenwick.
Roth L. Fenwick.

Inventor:
Francis F. Smith
John W. Lockwood
by their Attys
Fenwick & Lawrence

United States Patent Office.

FRANCIS F. SMITH, OF SANDUSKY, AND JOHN W. LOCKWOOD, OF GYPSUM, OHIO, ASSIGNORS TO THE SANDUSKY PLOW COMPANY, OF SANDUSKY, OHIO.

POWER-LIFT FOR PLOWS.

SPECIFICATION forming part of Letters Patent No. 262,547, dated August 8, 1882.

Application filed April 26, 1882. (Model.)

*To all whom it may concern:*

Be it known that we, FRANCIS F. SMITH, of Sandusky, in the county of Erie and State of Ohio, and JOHN W. LOCKWOOD, of Gypsum, in the county of Ottawa and State aforesaid, and both citizens of the United States, have invented a new and useful power-lift for sulky plows, cultivators, harrows, horse-rakes, and other farm implements drawn by horses, of which the following is a specification.

Our invention consists, first, in a swinging toothed rack, which is either straight or curved, interposed between a toothed ring or cylindrical toothed surface of one of the sulky-wheels and the crank-arm of a vibrating cranked or straight bar, to which a plow, cultivator, harrow, rake, or other agricultural implement is attached, and upon which it is raised and lowered by the power of the team; second, in a treadle-lever provided with a rocking stirrup for suspending the rack-bar and moving it in gear with the toothed ring or surface of the sulky-wheel for the purpose of effecting the elevation of the plow or other implement by the power of the team; third, in a hook or latch for holding up the plow or other implement after it is elevated; and, fourth, in certain constructions and combinations of parts, as hereinafter described and specifically claimed, whereby a very effective power-lift, possessing great simplicity, and which may be operated very conveniently, is secured.

Figure 1:
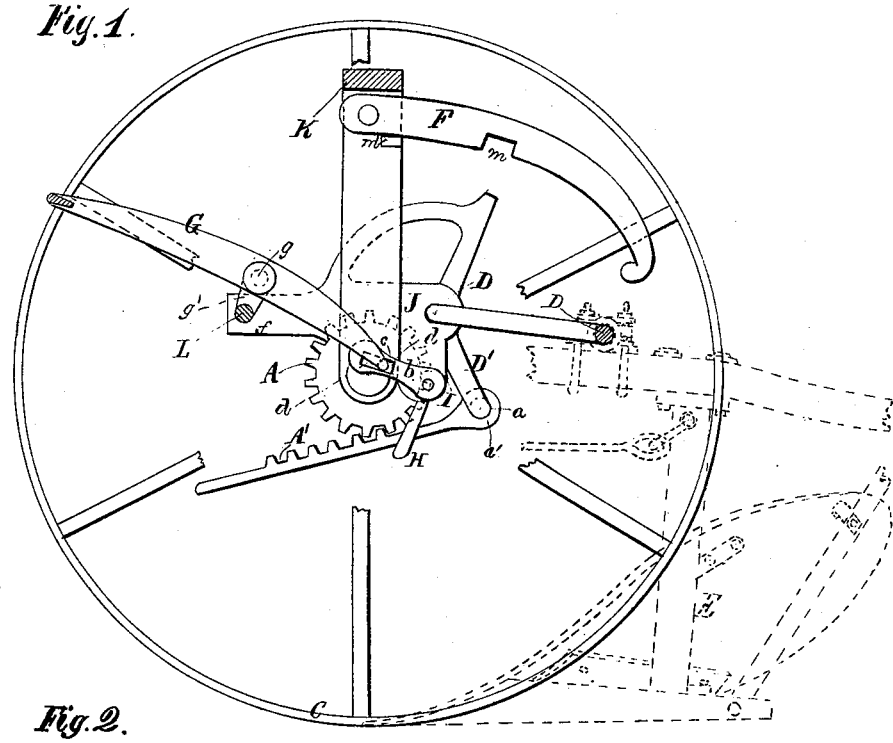
Figure 2:
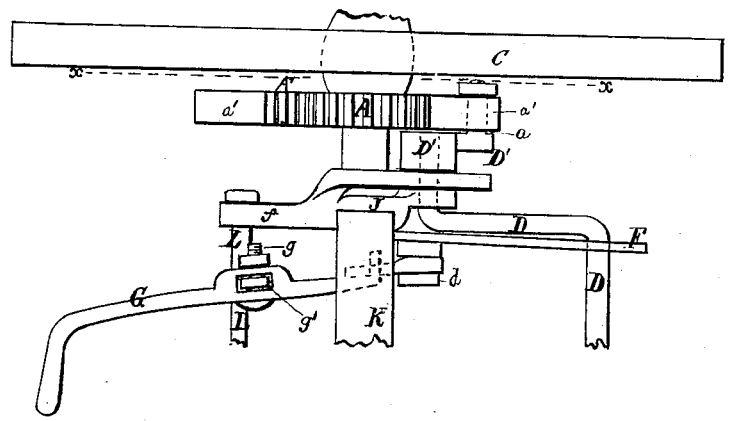
Figure 3:
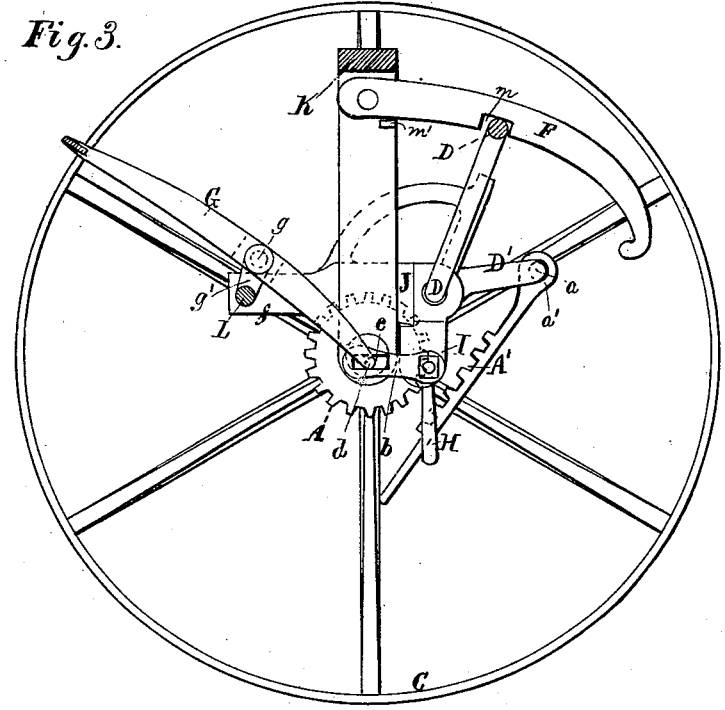
Figure 4:
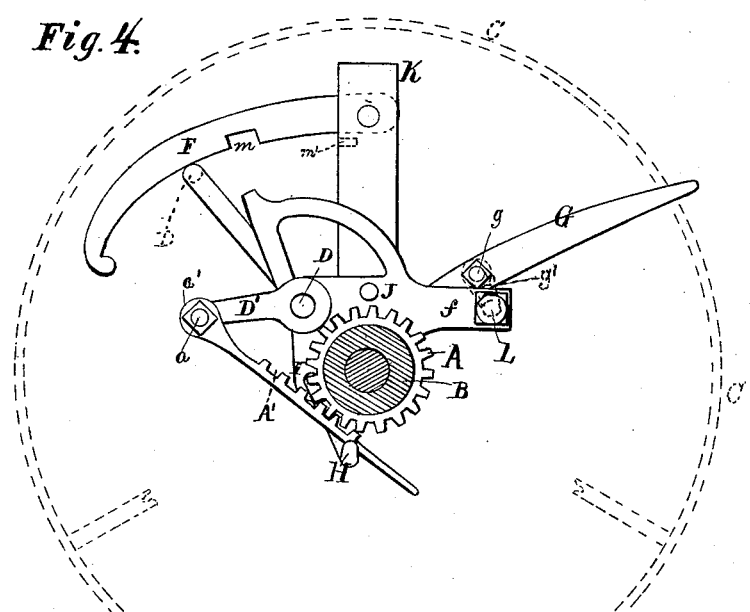

In the accompanying drawings, Figure 1 is a vertical longitudinal section of a plow-sulky with our improved power-lift applied thereto, a portion of the plow being shown in dotted lines and as it appears when plowing a furrow, while the toothed rack is shown moved by the treadle-stirrup in gear with and just ready for being moved by the toothed ring of the sulky-wheel. Fig. 2 is a plan view of the same with the plow removed. Fig. 3 is a vertical longitudinal section in the line $x\,x$ of Fig. 2, the bar upon which the plow is shown suspended in Fig. 1 and by which the plow is raised above the ground being raised to its highest point and locked up, the rack-bar being shown out of gear; and Fig. 4 is a vertical longitudinal section of Fig. 3, showing the rack as it appears after it has been moved by the toothed ring of the sulky-wheel a portion of the distance required for the elevation of the plow.

We have shown our invention applied to the plow-sulky patented to Francis F. Smith under Letters Patent dated and numbered respectively December 7, 1880, No. 235,175, and August 10, 1880, No. 230,902; but it may be applied to other sulky-plows and to horse cultivators, harrows, and rakes without changing its essential characteristics.

In the illustration shown a cogged surface, A, of circular form, is attached to the inner end of the hub B of the furrow-wheel C of the plow-sulky, and under this cogged surface a cogged rack, A', either straight or segmental in form, is swung, and the same connected to the lifting bail or bar D, to which the plow E (shown by dotted lines) is attached in the usual manner. The connection of the bar D with the rack A' is effected by means of a crank-arm, D', which is rigidly formed on or fastened to the right end of the bar, and extends downward and connects by its pivot end $a$ with the eye end $a'$ of the cogged rack A', as shown. The rack A', thus connected to the crank-arm D', is, with said arm, free to swing in an arc of a circle as it is moved forward by the rotary cogged surface A, and the arm D' being rigid with the plow-lifting bail or bar D, it will cause the cranked portion of said bar to swing up in an arc of a circle to the position shown in Fig. 3, and thereby lift the plow E to the proper height. The bar, with the plow, is held by a swinging self-hooking latch, F, provided with a notch or notches, $m$, while the plow is turning out at the end of a furrow or while it is being transported from one place to another. The proper position of the latch F may be controlled by a stop, $m'$, on the arched bar or other part of the sulky.

For supporting the free end of the cogged rack A' when the rack is out of gear with the cogged surface A, and also for throwing said rack into gear with said cogged surface A by the depression of a treadle-lever, G, a vibrating or rocking stirrup, H, is provided beneath the cogged rack A', and connected to the treadle-lever G by a crank-arm, $b$, which is slotted, as at $c$, and receives into its slot the pivot end of a projection, $d$, formed on the treadle-lever. The axial portion of the rocking stirrup H, upon which the stirrup is attached or formed, is provided with a supporting-sleeve or eye-bearing, I, formed on a strong bracket, J, and by said bracket supported firmly upon the arched bar K of the sulky-plow. This bearing may be constructed and applied in various forms, and the crank-arm b may be provided with a pivot-pin in place of the oblong slot c, and the pivot-projection d may be removed and a projection with a slot in it similar to c substituted therefor. The treadle-lever has its fulcrum-pin g passed through a bracket, g', of a fulcrum-support, L, which support is provided upon the plow-sulky forward of the arched bar K, and is fastened by one of its ends in a projection, f, of the bracket J, while its other end is fastened in a suitable projection (not shown) of the bracket, which is usually attached to the landside portion of arched bar K.

The within-described invention, when used with either plow-sulkies, harrows, or cultivators, will operate best if the plow, harrow, or cultivator is suspended upon a lifting bail or bar, D, which is cranked between its bearings, and has the crank-arm D' on one of its bearing ends, as shown; but when it is used with vibrating rake-heads a simple straight vibrating shaft having crank-arm D' will answer; and while with plows, harrows, and cultivators a latch or locking device, F, or its equivalent, may be used, such latch is not required with rake-heads.

The invention described operates as follows: The operator in the seat of the sulky, by a simple movement of the foot, acting on the treadle-lever with a medium downward pressure, causes the axial portion of the rocking stirrup H to roll in its bearing, and said rocking stirrup H, which supports the cogged rack or segment A, is thereby moved forward and upward, and this segment is made to mesh or gear with the circular rotating cogged surface A, as shown in Fig. 1. This effected, the forward and rotary movement of the sulky-wheel C causes the cogged surface A to act upon the teeth of the rack A', and thereby force the said rack backward and cause it to move the crank-arm D' of the lifting bail or bar D upward, and said arm in turn to turn the cranked portion of the lifting-bar D, with plow attached, a sufficient distance to lift and effect the locking of the bar, as shown in Fig. 3, and thus elevate the plow, so that it may be turned at the end of a furrow or transported from place to place. The movement of the rack A is stopped when it has been moved backward to the end of the cogs on its surface. The foot having been withdrawn from the treadle-lever as soon as the parts were brought into gear, the treadle descends to its normal position (see Fig. 3) at the moment the teeth of the rack become "run out." It can thus descend, inasmuch as the slotted connection c d allows it to move independently of the rocking stirrup in assuming such normal position. As soon as the plow has been raised and the cogged surfaces A A' become ungeared the rocking stirrup H descends and allows the rack A' to assume its normal position, as shown in Fig. 3. This it can do, as the slotted connection c d allows the stirrup to move independently of the treadle while it is assuming such normal position.

It is obvious that this invention may be applied in connection with plow-sulkies having notched sectors and hand-levers with locking bolts or latches, and that the lifting bail or bar D and latches E may be appropriately connected to hand-levers, all in such a manner that the plow can at will be raised and lowered by hand-power, and the latches locked and released by movements of the hand-levers from the seats of the plow-sulkies.

What we claim as our invention, and desire to secure by Letters Patent, is—

1. The combination, with a cogged gear, A, applied to the axle-supporting wheel, of a cogged rack, A', applied directly to the rigid crank-arm D' of the lifting bail or bar of a plow or other implement, and a stirrup for the rack, said gear and rack being normally out of gear, and combined and brought into gear with each other by the actuating-lever and rocking stirrup, whereby the revolution of the wheel causes the rigid crank-arm to be turned and the bail or bar and plow-beam to be raised to any desired height, substantially as described.

2. The combination of the treadle-lever G and rocking stirrup H, having a slotted connection, c d, the swinging cogged rack A', cogged surface A, and the lifting bail or bar D, having a crank-arm, D', substantially as and for the purpose described.

3. The combination of the self-latching hook F with the plow-lifting bar D D' and the cogged gearing A A', substantially as and for the purpose described.

4. The lifting-bar D, to which the plow is attached, provided with a rigid crank-arm, D', and a toothed rack, A', pivoted directly to said arm, substantially as and for the purpose described.

5. The bracket J, provided with the sleeve or eye-bearing I for the axial portion of the rocking stirrup H to rest and roll in, substantially as described.

6. The combination, with the rack-bar A' and toothed surface A, of the rocking stirrup H for supporting the rack-bar out of gear and for lifting it in gear, substantially as described.

7. The rocking stirrup H, provided with a slotted crank-arm, b, substantially as and for the purpose described.

8. The combination, with the stirrup H, gearing A A', and the lifting-bar D D', of the treadle-lever G, provided with a fulcrum-support, L, forward of the arched bar K, substantially as and for the purpose described.

FRANCIS F. SMITH.
JOHN W. LOCKWOOD.

Witnesses:
ARTHUR PHINNY,
N. V. LATHAM.
For John W. Lockwood:
C. C. PECK,
R. HUGEL.